US009594213B2

United States Patent
Qian et al.

(10) Patent No.: US 9,594,213 B2
(45) Date of Patent: Mar. 14, 2017

(54) TEMPERATURE CONTROL OF COMPONENTS ON AN OPTICAL DEVICE

(71) Applicant: Kotura, Inc., Monterey Park, CA (US)

(72) Inventors: Wei Qian, Torrance, CA (US); Dazeng Feng, El Monte, CA (US); Cheng-Chih Kung, San Gabriel, CA (US); Jay Jie Lai, Artesia, CA (US)

(73) Assignee: Mellanox Technologies Silicon Photonics Inc., Monterey Park, CA (US)

(*) Notice: Subject to any disclaimer, the term of this patent is extended or adjusted under 35 U.S.C. 154(b) by 0 days.

(21) Appl. No.: 14/671,348

(22) Filed: Mar. 27, 2015

(65) Prior Publication Data

US 2016/0282557 A1    Sep. 29, 2016

(51) Int. Cl.
*G02B 6/136* (2006.01)
*G02B 6/12* (2006.01)

(52) U.S. Cl.
CPC .... *G02B 6/136* (2013.01); *G02B 2006/12097* (2013.01); *G02B 2006/12142* (2013.01); *G02B 2006/12173* (2013.01)

(58) Field of Classification Search
CPC .. G02B 6/136; G02B 6/12021; G02B 6/3594; G02B 6/2773; G02F 1/011; G02F 1/17; G02F 1/313
See application file for complete search history.

(56) References Cited

U.S. PATENT DOCUMENTS

| | | | | |
|---|---|---|---|---|
| 2001/0026669 A1* | 10/2001 | Nashimoto | .......... | G02B 6/1228 385/129 |
| 2007/0019911 A1* | 1/2007 | Wu | .......... | G02B 6/1221 385/40 |
| 2011/0182545 A1* | 7/2011 | Ishikawa | .......... | G02B 6/12021 385/16 |
| 2015/0200130 A1* | 7/2015 | Huang | .......... | H01L 21/0274 438/618 |
| 2016/0062037 A1* | 3/2016 | Horino | .......... | G02B 6/1228 385/14 |

* cited by examiner

*Primary Examiner* — Duy Deo
(74) *Attorney, Agent, or Firm* — Gavrilovich, Dodd & Lindsey, LLP

(57) ABSTRACT

A method of forming an optical device includes using a photomask to form a first mask on a device precursor. The method also includes using the photomask to form a second mask on the device precursor. The second mask is formed after the first mask. In some instances, the optical device includes a waveguide positioned on a base. The waveguide is configured to guide a light signal through a ridge. A heater is positioned on the ridge such that the ridge is between the heater and the base.

17 Claims, 11 Drawing Sheets

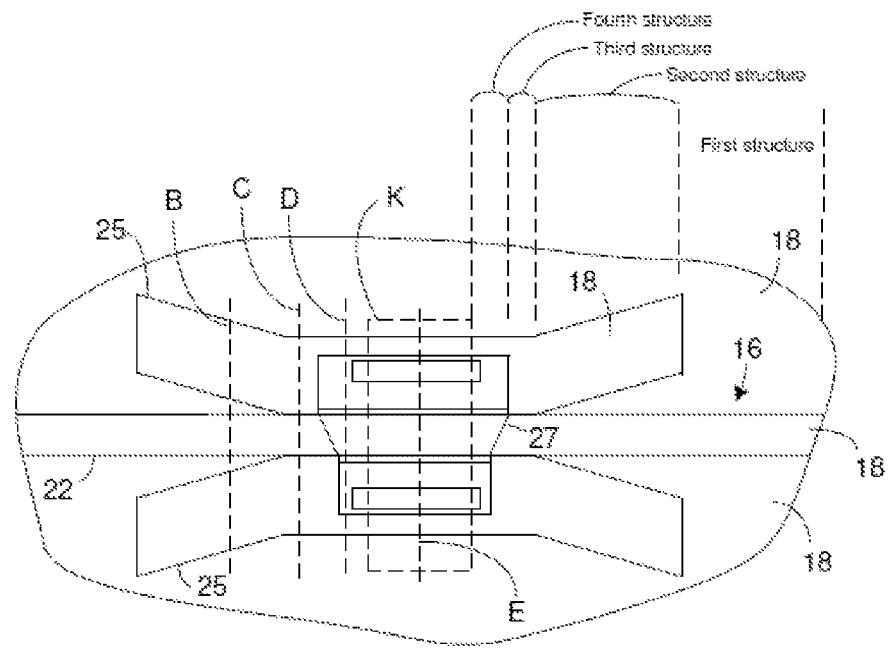
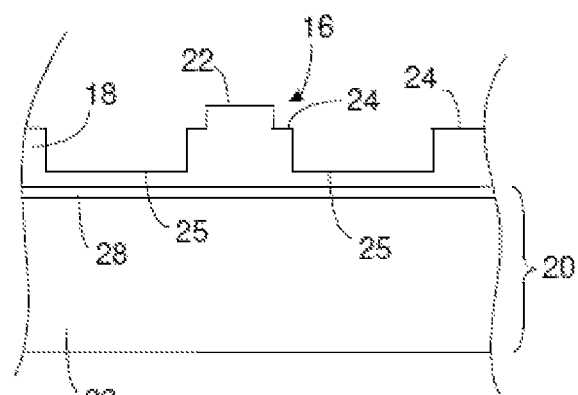
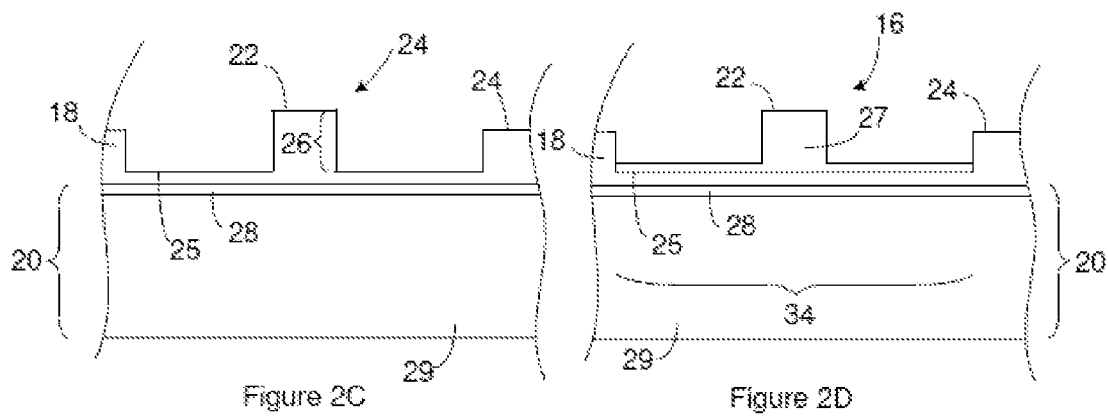
Figure 2A
Figure 2B
Figure 2C
Figure 2D

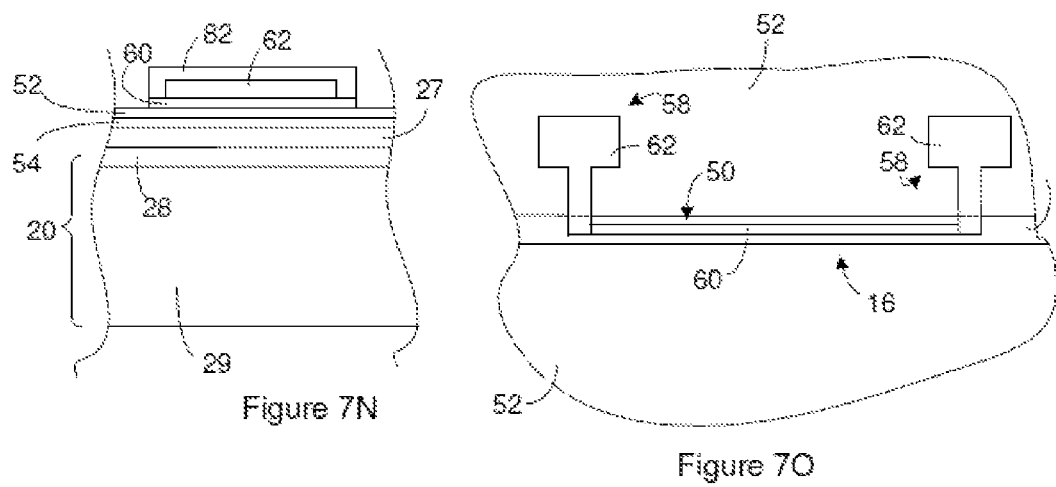
Figure 7N
Figure 7O
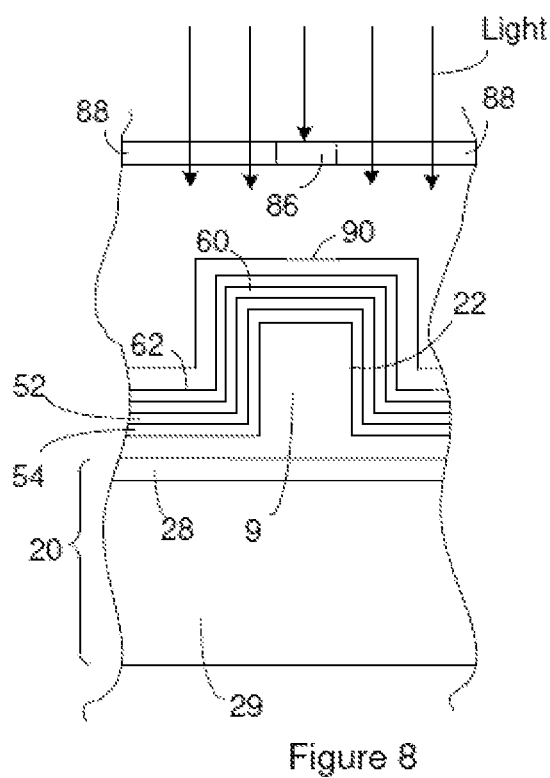
Figure 8

US 9,594,213 B2

TEMPERATURE CONTROL OF COMPONENTS ON AN OPTICAL DEVICE

RELATED APPLICATIONS

This application is related to U.S. patent application Ser. No. 14/231,383, filed on Mar. 31, 2014, entitled "Temperature Control of Components on an Optical Device," and incorporated herein in its entirety.

FIELD

The present invention relates to optical components and particularly, to temperature control of optical components.

BACKGROUND

Many communications applications require the linking of multiple different optical components such as light source and modulators. For instance, there is a demand for modulators that modulate a light signal from a light source such as a laser. These components are often designed so they work well together at a particular temperature. However, different optical components such as lasers and modulators generally respond to temperature changes differently. As a result, two components may operate well together at one temperature but fail to operate together at other temperatures. As a result, there is a need for an optical device that integrates multiple optical components and can be used in a variety of temperature conditions.

SUMMARY

A method of forming an optical device includes using a photomask to form a first mask on a device precursor. The method also includes using the photomask to form a second mask on the device precursor. The second mask is formed after the first mask.

A method of forming an optical device includes generating a device having a layer of a material on a device precursor. The method also includes forming a first mask on the layer of a material such that the layer of material is between the device precursor and the first mask. The first mask has edges between a top side and a bottom side. The bottom side of the mask is between the top side of the mask and the device. The method also includes etching the device such that the layer of material is removed from under the first mask such that an opening through the material extends from under one edge of the first mask to under an opposing edge of the first mask.

In some instances, the optical device includes a waveguide positioned on a base. The waveguide is configured to guide a light signal through the modulator such that the light signal is guided through the electro-absorption medium. A heater is positioned on the electro-absorption medium such that the electro-absorption medium is between the heater and the base.

BRIEF DESCRIPTION OF THE FIGURES

FIG. 1A is a perspective view of the device.

FIG. 1B is a cross section of the device taken along the line labeled B in FIG. 1A.

FIG. 2A through FIG. 2E illustrate construction of a modulator that is suitable for use as the modulator of FIG. 1A. FIG. 2A is a topview of the portion of the optical device shown in FIG. 1A that includes an optical modulator.

FIG. 2B is a cross-section of the optical device shown in FIG. 2A taken along the line labeled B.

FIG. 2C is a cross-section of the optical device shown in FIG. 2A taken along the line labeled C.

FIG. 2D is a cross-section of the optical device shown in FIG. 2A taken along the line labeled D.

FIG. 2E is a cross-section of the optical device shown in FIG. 2A taken along the line labeled E.

FIG. 4A is a topview of the portion of the device that includes the modulator.

FIG. 4B is a cross section of the modulator shown in FIG. 4A taken along the line labeled B in FIG. 4A.

FIG. 4C is a cross section of the modulator shown in FIG. 4A taken along the longitudinal axis of the waveguide.

FIG. 6A is a cross section of the device taken through the modulator.

FIG. 6B is a cross section of the device taken along the length of the waveguide.

FIG. 7A through FIG. 7O illustrate a method of forming a heater on an optical component. FIG. 7A is a cross section of a portion of a device precursor where the heater will be fabricated.

FIG. 7C can be a cross section of the device precursor shown in FIG. 7D taken along the line labeled C in FIG. 7D.

FIG. 7I is a cross section of a portion of the device precursor.

FIG. 7N can be a cross section of the device precursor shown in FIG. 7M taken along the line labeled M in FIG. 7M.

FIG. 7O is a topview of the device precursor shown in FIG. 7L through FIG. 7N after the second mask is removed from the device precursor of FIG. 7L through FIG. 7N.

FIG. 8 illustrates use of a photomask.

DESCRIPTION

An optical device has a modulator that includes an electro-absorption medium. The device also includes a waveguide configured to guide a light signal through the electro-absorption medium included in the modulator. The device also includes a localized heater that is positioned on at least a portion of the electro-absorption medium that is included in the modulation. For instance, the modulator can include a ridge of the electro-absorption medium and the heater can be positioned on top of the ridge of electro-absorption medium. Electronics can operate the heater such that the modulator provides efficient modulation despite the temperature of the source of the light signal being anywhere in the full operational temperature range of the device. Placing the heater on the ridge rather than spaced apart from the ridge provides a more direct heat transfer to the modulator and accordingly reduces the energy requirements of the heater. For instance, simulation results have shown that maximum power usage of only 54-108 mW per heater can be achieved. It may be possible to achieve this same result by controlling the temperature of the entire device through the use of temperature control systems such as thermoelectric coolers (TEC). However, these temperature control systems add cost and complexity to the device at the point of fabrication. Further, these temperature control system have undesirably large power requirements and are accordingly associated with ongoing operation costs. As a result, the localized heater can reduce the costs and power requirements associated with the device.

Current methods of forming the heater and the associated electrical connections require sequential masking and etching steps. The masks often must be aligned with features formed in a previous etching step. This alignment can be challenging. Further, the current process can result in undesirable metal residue being present on the ridge. This metal residue can reduce the efficiency of devices such as modulators. As a result, the current methods of forming the heater are complicated, costly, and difficult to control. The inventors have found a method for using the same photomask to sequentially form different photoresists for heater fabrication. The use of the same photomask simplifies alignment of the photomask with previously formed features. Further, the complexity and cost of the fabrication process are reduced. Additionally, the disclosed method etches the electrical connections associated with the heater before etching the heater. During this etch, the metal for the heater can act as an etch stop. As a result, the residual metals that are often present on the ridge after formation of the heater are efficiently removed form the ridge. Since these residual metals reduce the efficiency of optical devices such as modulators, this method can also increase the efficiency of the device.

Figure 1A:
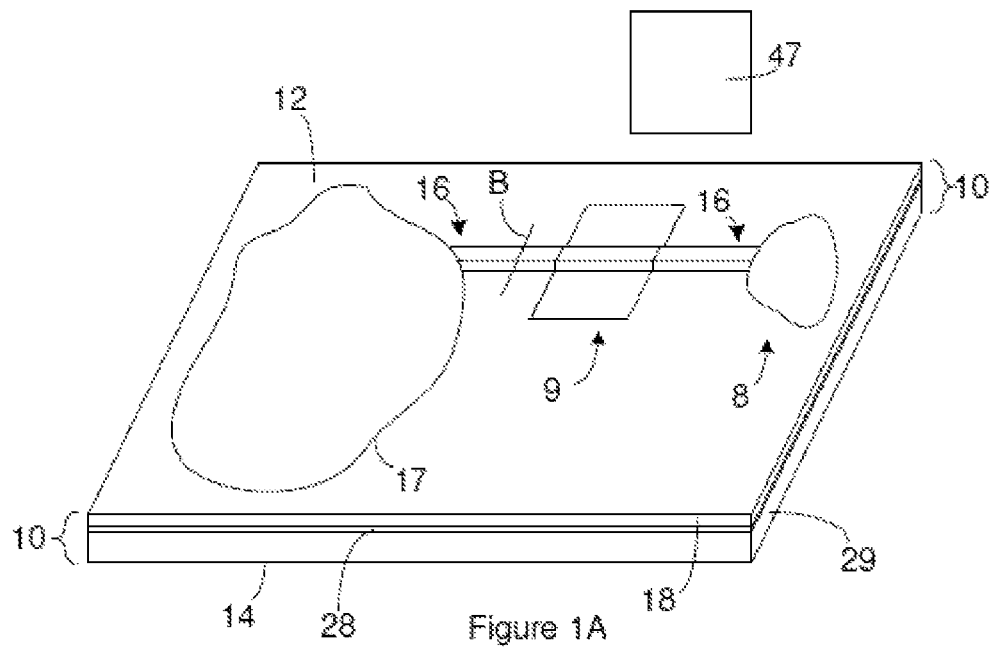
FIG. 1A and FIG. 1B illustrates an optical device having a waveguide that guides a light signal between a light source and a modulator.
Figure 1B:
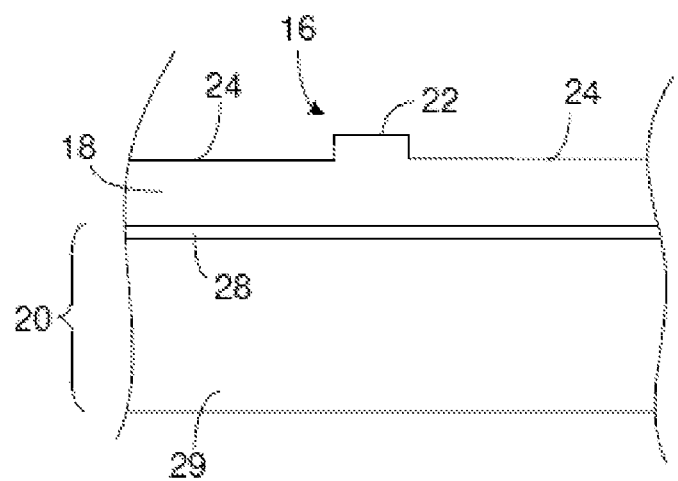

FIG. 1A and FIG. 1B illustrate an optical device having a waveguide that guides a light signal between a light source 8 and a modulator 9. FIG. 1A is a perspective view of the device. FIG. 1B is a cross section of the device taken along the line labeled B in FIG. 1A. FIG. 1A and FIG. 1B do not show details of either the light source 8 or the modulator but illustrates the relationship between these components and the waveguide.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act as a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1B. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be a light insulator 28 with a lower index of refraction than the light-transmitting medium 18. The drop in the index of refraction can cause reflection of a light signal from the light-transmitting medium 18 back into the light-transmitting medium 18. The base 20 can include the light insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the light insulator 28 and the silicon substrate can serve as the substrate 29.

Although the light source 8 is shown positioned centrally on the device, the light source 8 can be positioned at the edge of the device. The light source 8 can be any type of light source including light sources that convert electrical energy into light. Examples of suitable light sources include, but are not limited to, a semiconductor laser, and a semiconductor amplifier such as a reflection semiconducting optical amplifier (RSOA). Examples of suitable lasers include, but are not limited to, Fabry-Perot lasers, Distributed Bragg Reflector lasers (DBR lasers), Distributed FeedBack lasers (DFB lasers), external cavity lasers (ECLs). A variety of suitable lasers and laser constructions are disclosed in light source applications including U.S. patent application Ser. No. 13/385,774, filed on Mar. 5, 2012, and entitled "Integration of Components on Optical Device;" U.S. patent application Ser. No. 14/048,685, filed on Oct. 8, 2013, and entitled "Use of Common Active Materials in Optical Components;" U.S. Provisional Patent Application Ser. No. 61/825,501, filed on May 20, 2013, and entitled "Reducing Power Requirements for Optical Links;" U.S. patent application Ser. No. 13/694, 047, filed on Oct. 22, 2012, and entitled "Wafer Level Testing of Optical Components;" U.S. patent application Ser. No. 13/506,629, filed on May 2, 2012, and entitled "Integration of Laser into Optical Platform;" U.S. patent application Ser. No. 13/573,892, filed on Oct. 12, 2012, and entitled "Reduction of Mode Hopping in a Laser Cavity;" U.S. patent application Ser. No. 13/317,340, filed on Oct. 14, 2011, and entitled "Gain Medium Providing Laser and Amplifier Functionality to Optical Device;" U.S. patent application Ser. No. 13/385,275, filed on Feb. 9, 2012, and entitled "Laser Combining Light Signals from Multiple Laser Cavities;" each of which is incorporated herein in its entirety. The light source 8 can be constructed as disclosed in any one or more of the light source applications and/or can be interfaced with the device as disclosed in any one or more of the light source applications. Other suitable light sources include interdevice waveguides that carry a light signal to the device from another device such as an optical fiber. A variety of interfaces between an optical fiber and a device constructed according to FIG. 1A and FIG. 1B are disclosed in fiber interface patents applications including U.S. patent application Ser. No. 12/228,007, filed on Nov. 14, 2008, and entitled "Optical System Having Optical Fiber Mounted to Optical Device," now abandoned; and U.S. patent application Ser. No. 12/148,784, filed on Apr. 21, 2008, entitled "Transfer of Light Signals Between Optical Fiber and System Using Optical Devices with Optical Vias," and issued as U.S. Pat. No. 8,090,231; each of which is incorporated herein in its entirety. The light source 8 can an optical fiber interfaced with a device as disclosed in any one or more of the fiber interface patents applications. In some instances, the device does not include a light source. For instance, the waveguide can terminate at a facet located at or near the perimeter of the device and a light signal traveling through air can then be injected into the waveguide through the facet. Accordingly, the light source is optional.

Figure 2E:
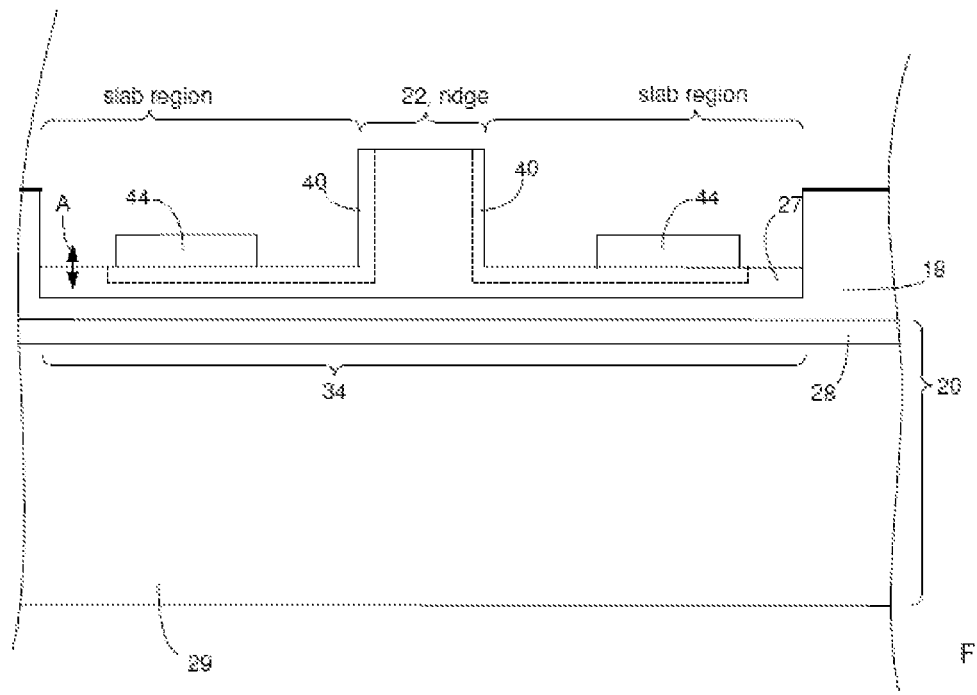

FIG. 2A through FIG. 2E illustrate construction of a modulator that is suitable for use as the modulator of FIG. 1A. FIG. 2A is a topview of the portion of the optical device shown in FIG. 1A that includes an optical modulator. FIG. 2B is a cross-section of the optical device shown in FIG. 2A taken along the line labeled B. FIG. 2C is a cross-section of the optical device shown in FIG. 2A taken along the line labeled C. FIG. 2D is a cross-section of the optical device shown in FIG. 2A taken along the line labeled D. FIG. 2E is a cross-section of the optical device shown in FIG. 2A taken along the line labeled E.

Recesses 25 (FIG. 2A) extend into the slab regions such that the ridge 22 is positioned between recesses 25. The recesses 25 can extend part way into the light-transmitting medium 18. As is evident from FIG. 2B, the recesses 25 can be spaced apart from the ridge 22. As a result, a portion of the waveguide 16 includes a second structure where an upper portion of the waveguide 16 is partially defined by the ridge 22 extending upward from the slab region and a lower portion of the waveguide is partially defined by recesses 25 extending into the slab regions and spaced apart from the ridge.

As shown in FIG. 2C, the recesses 25 can approach the ridge 22 such that the sides of the ridge 22 and the sides of the recesses 25 combine into a single surface 26. As a result, a portion of a waveguide includes a third structure where the waveguide is partially defined by the surface 26.

As is evident in FIG. 2A, a portion of the waveguide 16 includes an electro-absorption medium 27. The electro-absorption medium 27 is configured to receive the light signals from a portion of the waveguide having the third structure and to guide the received light signals to another portion of the waveguide having the third structure.

In FIG. 2D, a ridge 22 of electro-absorption medium 27 extends upward from a slab region of the electro-absorption medium 27. Accordingly, a portion of a waveguide includes a fourth structure configured to guide the received light signal through the electro-absorption medium 27. This portion of the waveguide is partially defined by the top and lateral sides of the electro-absorption medium 27. The slab regions of the electro-absorption medium 27 and the ridge 22 of the electro-absorption medium 27 are both positioned on a seed portion 34 of the light-transmitting medium 18. As a result, the seed portion 34 of the light-transmitting medium 18 is between the electro-absorption medium 27 and the base 20. In some instances, when the light signal travels from the light-transmitting medium into the electro-absorption medium 27, a portion of the light signal enters the seed portion 34 of the light-transmitting medium 18 and another portion of the light signal enters the electro-absorption medium 27. As described above, the electro-absorption medium 27 can be grown on the seed portion of the light-transmitting medium 18. The seed layer is optional. For instance, the electro-absorption medium 27 can be grown or otherwise formed directly on the seed portion of the light-transmitting medium 18

As is evident in FIG. 2A, there is an interface between each facet of the electro-absorption medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The optical device includes a modulator. The location of the modulator on the optical device is illustrated by the line labeled K in FIG. 2A. In order to simplify FIG. 2A, the details of the modulator construction are not shown in FIG. 2A. However, the modulator construction is evident from other illustrations such as FIG. 2E. The modulator of FIG. 2E is constructed on the portion of the waveguide having a fourth structure constructed according to FIG. 2D. The perimeter of portions of doped regions shown in FIG. 2E are illustrated with dashed lines to prevent them from being confused with interfaces between different materials. The interfaces between different materials are illustrated with solid lines. The modulator is configured to apply an electric field to the electro-absorption medium 27 in order to phase and/or intensity modulate the light signals received by the modulator.

A ridge 22 of the electro-absorption medium 27 extends upward from a slab region of the electro-absorption medium 27. Doped regions 40 are both in the slab regions of the electro-absorption medium 27 and also in the ridge of the electro-absorption medium 27. For instance, doped regions 40 of the electro-absorption medium 27 are positioned on the lateral sides of the ridge 22 of the electro-absorption medium 27. In some instances, each of the doped regions 40 extends up to the top side of the electro-absorption medium 27 as shown in FIG. 2E. Additionally, the doped regions 40 extend away from the ridge 22 into the slab region of the electro-absorption medium 27. The transition of a doped region 40 from the ridge 22 of the electro-absorption medium 27 into the slab region of the electro-absorption medium 27 can be continuous and unbroken as shown in FIG. 2E.

Each of the doped regions 40 can be an N-type doped region or a P-type doped region. For instance, each of the N-type doped regions can include an N-type dopant and each of the P-type doped regions can include a P-type dopant. In some instances, the electro-absorption medium 27 includes a doped region 40 that is an N-type doped region and a doped region 40 that is a P-type doped region. The separation between the doped regions 40 in the electro-absorption medium 27 results in the formation of PIN (p-type region-insulator-n-type region) junction in the modulator.

In the electro-absorption medium 27, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Electrical conductors 44 are positioned on the slab region of the electro-absorption medium 27. In particular, the electrical conductors 44 each contact a portion of a doped region 40 that is in the slab region of the electro-absorption medium 27. Accordingly, each of the doped regions 40 is doped at a concentration that allows it to provide electrical communication between an electrical conductor 44 and in the ridge of electro-absorption medium 27. As a result, electrical energy can be applied to the electrical conductors 44 in order to apply the electric field to the electro-absorption medium 27. The region of the light-transmitting medium or electro-absorption medium between the doped regions can be undoped or lightly doped as long as the doping is insufficient for the doped material to act as an electrical conductor that electrically shorts the modulator.

During operation of the modulators of FIG. 1A through FIG. 2E, electronics 47 (FIG. 1A) can be employed to apply electrical energy to the electrical conductors 44 so as to form an electrical field in the electro-absorption medium 27. For instance, the electronics can form a voltage differential between the doped regions that act as a source of the electrical field in the gain medium. The electrical field can be formed without generating a significant electrical current through the electro-absorption medium 27. The electro-absorption medium 27 can be a medium in which the Franz-Keldysh effect occurs in response to the application of the electrical field. The Franz-Keldysh effect is a change in optical absorption and optical phase by an electro-absorption medium 27. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the electro-absorption medium 27 can absorb light signals received by the electro-absorption medium 27 and increasing the electrical field increases the amount of light absorbed by the electro-absorption medium 27. Accordingly, the electronics can tune the electrical field so as to tune the amount of light absorbed by the electro-absorption medium 27. As a result, the electronics can intensity modulate the electrical field in order to modulate the light signal. Additionally, the electrical field needed to take advantage of the Franz-Keldysh effect generally does not involve generation of free carriers by the electric field.

Suitable electro-absorption media 27 for use in the modulator include semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

A modulator having a cross section according to FIG. 2E can be sensitive to the thickness of the slab regions of the electro-absorption medium 27. For instance, as the thickness of the slab region increases, the ridge becomes smaller and the electrical field formed between the doped regions 40 accordingly fills a smaller portion of the distance between the base 20 and the top of the ridge. For instance, the location of the electrical field effectively moves upwards from the base 20. The increased space between the electrical field and the base 20 can be thought of as increasing the resistance or carrier diffusion time of the modulator. This increase in resistance and/or diffusion time decreases the speed of the modulator. Problems also occur when these slab regions become undesirably thin. When these slab regions become thin, the doped regions extend down into the light-transmitting medium 18. This doping of the light-transmitting medium 18 also decreases the speed of the modulator.

Figure 3:
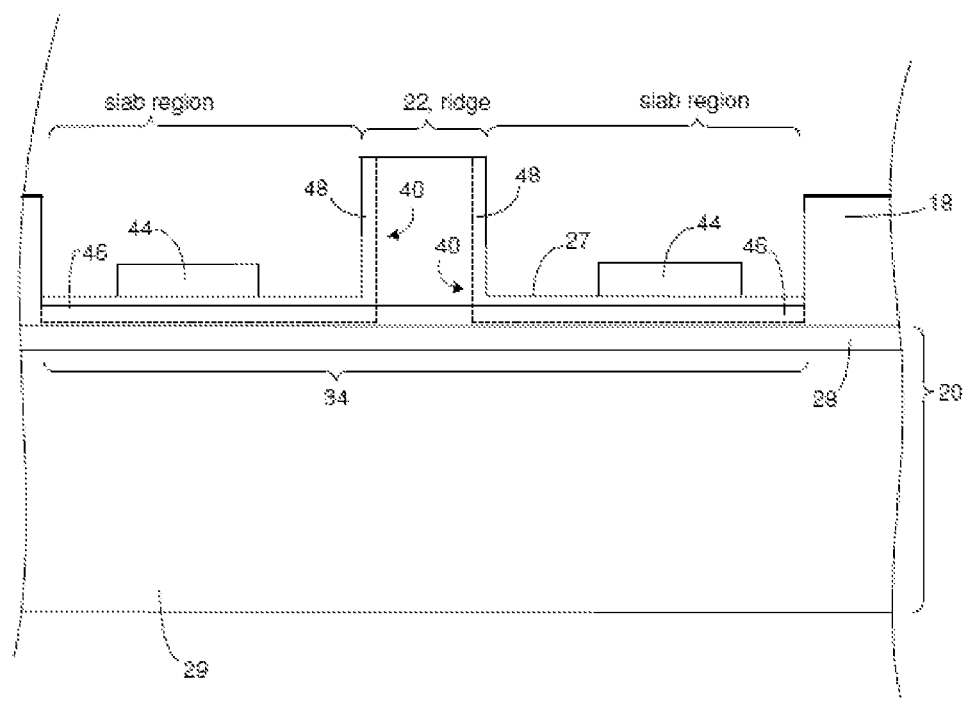
FIG. 3 is a cross section of an embodiment of a modulator having a reduced sensitivity to the thickness of the slab regions on opposing sides of a waveguide.

FIG. 3 presents an embodiment of a modulator having a reduced sensitivity to the thickness of the slab regions. The perimeter of portions of doped regions shown in FIG. 3 are illustrated with dashed lines to prevent them from being confused with interfaces between different materials. The interfaces between different materials are illustrated with solid lines. A first doped zone 46 and a second doped zone 48 combine to form each of the doped regions 40. In some instance, the first doped zone 46 is located in the light-transmitting medium 18 but not in the electro-absorption medium 27 and the second doped zone 48 is located in the electro-absorption medium 27. The first doped zone 46 can contact the second doped zone 48 or can overlap with the second doped zone 48. In some instances, the first doped zone 46 and the second doped zone 48 overlap and at least a portion of the overlap is located in the light-transmitting medium 18. In other instances, the first doped zone 46 and the second doped zone 48 overlap without any overlap being present in the electro-absorption medium 27.

The first doped zone 46 and the second doped zone 48 included in the same doped region 40 each includes the same type of dopant. For instance, the first doped zone 46 and the second doped zone 48 in an n-type doped region 40 each includes an n-type dopant. The first doped zone 46 and the second doped zone 48 included in the same doped region 40 can have the same dopant concentration or different concentrations.

Although FIG. 3 illustrates the slab regions including the electro-absorption medium 27, the slab regions of the electro-absorption medium 27 may not be present. For instance, the etch that forms the slab regions of the electro-absorption medium 27 may etch all the way through the slab regions. In these instances, the first doped zone 46 and the second doped zone 48 are both formed in the light-transmitting medium.

Although FIG. 3 shows the first doped zone 46 not extending down to the light insulator 28, the first doped zone 46 can extend down to the light insulator 28 or into the light insulator 28.

Figure 4A:
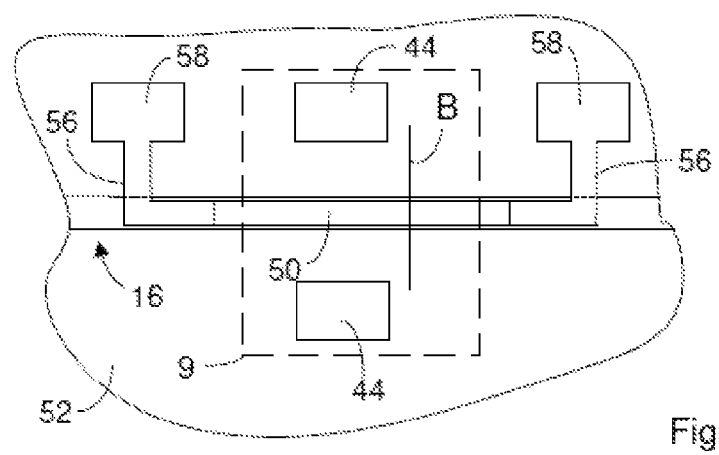
FIG. 4A through FIG. 4C illustrate a localized heater in conjunction with a modulator.
Figure 4B:
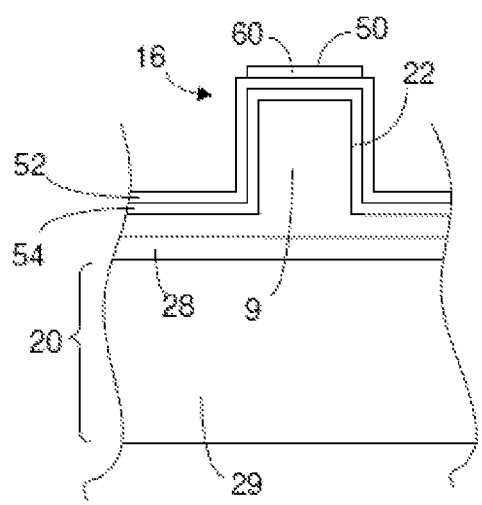
Figure 4C:
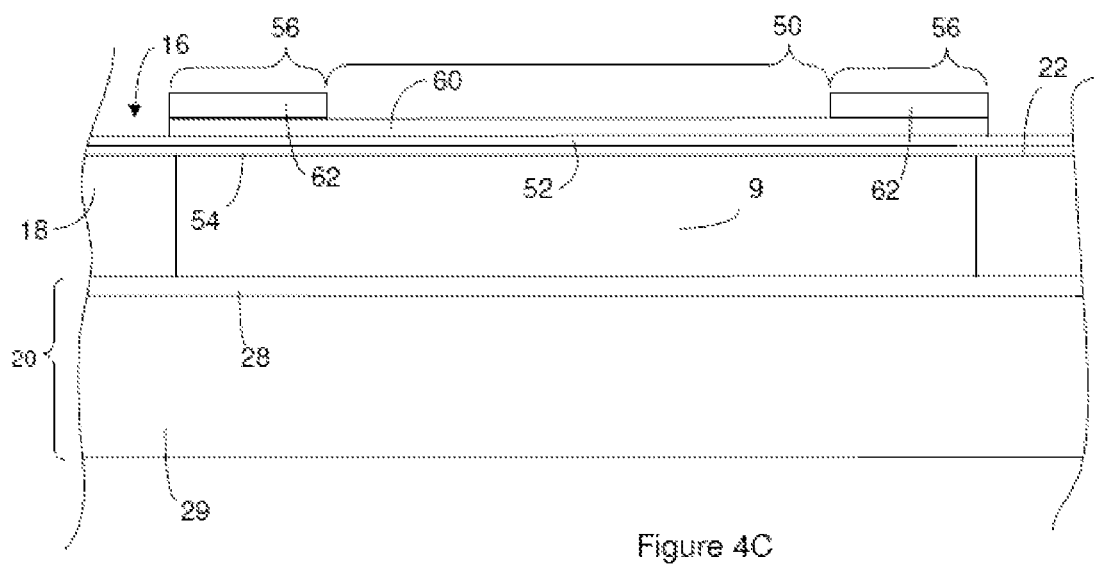

The above modulators can include a localized heater configured to heat all or a portion of the modulator. The localized heaters are not illustrated in FIG. 2A through FIG. 3 in order to illustrate the parts that underlay the heater. However, FIG. 4A through FIG. 4C illustrate the localized heater in conjunction with a modulator. The details of the modulator are not illustrated, but the modulator can be constructed according to FIG. 2E or FIG. 3 or can have another construction. FIG. 4A is a topview of the portion of the device that includes the modulator. FIG. 4B is a cross section of the modulator shown in FIG. 4A taken along the line labeled B in FIG. 4A. FIG. 4C is a cross section of the modulator shown in FIG. 4A taken along the longitudinal axis of the waveguide 16.

The heater 50 is on the ridge 22 such that the modulator is positioned between the heater 50 and the base. One or more layers of material can optionally be positioned between the heater and the ridge. For instance, the heater 50 can be located on an insulating layer 52 that electrically insulates the heater from the underlying layers. The insulating layer 52 is positioned between the heater and the ridge 22. Suitable insulating layers 52 include, but are not limited to, silica and silicon nitride. An insulating layer with a higher thermal conductivity may be preferred in or to provide a pathway from heat to travel from the heater to the modulator. Accordingly, insulating layers 52 that are thinner and/or have a higher thermal conductivity may be desired. In some instances, the insulating layer 52 has a thermal conductivity above 10 W/(m K).

One or more claddings 54 are optionally positioned between the waveguide 16 and the insulating layer 52 and/or between the waveguide 16 and the heater 50. At least one of the claddings 54 can directly contact the light-transmitting medium 18. A cladding that contacts light-transmitting medium 18 preferably has a lower index of refraction than the light-transmitting medium 18. When the light-transmitting medium 18 is silicon, suitable claddings include, but are not limited to, polymers, silica, SiN and LiNbO$_3$. In some instances, a single layer of material can serve as both a cladding 54 and an insulating layer 52. Although the insulating layer 52 is shown as a single layer of material, the insulating layer 52 can include or consist of multiple layers of material.

Conductors 56 are positioned so as to provide electrical communication between the heater 50 and contact pads 58. The conductors 56 and contact pads 58 can be electrically conducting. The electronics 47 can apply electrical energy to the contact pads 58 so as to deliver electrical energy to the heater 50 and can accordingly operate the heater so the heater 50 generates heat. The location of the heater on the ridge 22 allows the generated heat to elevate the temperature of the ridge through a mechanism such as conduction.

In some instances, the heater 50 is an "electrical resistance heater." For instance, the heater 50 can include or consist of an electrically conducting layer 60 that serves as a resistor. An example of a suitable resistor is a trace that includes or consists of a metal, metal alloy. Examples heaters include or consist of titanium traces, tungsten titanium traces, nichrome traces and TiN traces. During operation of the device, the electronics 47 can drive sufficient electrical current through the electrically conducting layer 60 to cause the electrically conducting layer 60 to generate the heat that is conducted to the modulator. The conductors 56 can include or consist of an electrically conductive layer 62 and can be arranged such that the electrical current flows parallel or substantially parallel to the ridge 22 or the direction of light signal propagation through the ridge. As a result, the length of the ridge 22 that is heated by the heater can be increased merely by increasing the length of the resistor.

The electrically conducting layer 60 can have a higher resistance/length than the electrically conductive layers 62 in order to stop or reduce generation of heat by the conductors 56. This can be achieved by using different materials and/or dimensions for the electrically conductive layer 62 and the conducting layer 60. For instance, the electrically conductive layer 62 can be aluminum while the conducting layer 60 that serves as the heater is titanium. Titanium has a specific electrical resistance of about 55 µohm-cm while aluminum has a specific electrical resistance of about 2.7 µohm-cm. As a result, the conductors 56 and conducting layer 60 can have similar cross sectional dimensions and an electrical current can be driven through the conductors 56 and conducting layer such that heat is generated at the conducting layer without undesirable levels of heat being generated by the conductors 56. Alternately, the conductors 56 can have larger cross section dimensions than the heater in order to further reduce heat generation by the conductors 56. For instance, a ratio of the cross section area of the conductors 56; cross sectional area of the conducting layer 60 can be larger than 2:1, 3:1, or 4:1 where the cross sections are taken perpendicular to the length of the conductor 56 or conducting layer 60. In some instances, the width of the heater or conducting layer 60 is greater than or equal to 20, 30, or 40 μm and/or less than 50, 75, or 200 μm.

In some instances, the conductors 56 include a conducting layer 60 from the heater 50 in addition the conductive layer 62 as is evident in FIG. 4B. In these instances, the conductive layer 62 can be more conductive and/or have larger dimensions than the conducting layer 60 in order to reduce generation of heat by the conductor 56. A suitable ratio for the specific electrical resistance of the conducting layer 60:conductive layer 62 is greater than 5:1, 10:1, or 50:1.

Figure 5A:
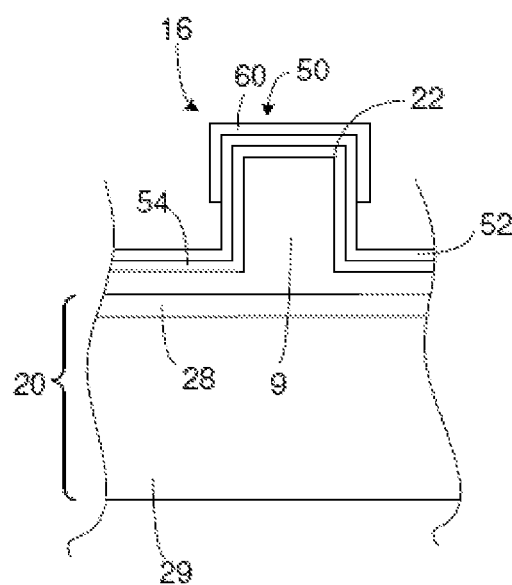
FIG. 5A is a cross section of a portion of a device that includes a heater on a modulator. The heater is positioned over the top and lateral sides of the modulator.

FIG. 4A through FIG. 4C illustrate the heater 50 as being positioned on the top of the electro-absorption medium or on top of the ridge 22. Additionally or alternatively, the heater can be positioned on one or more lateral sides of the electro-absorption medium or on one or more lateral sides of the ridge 22. For instance, FIG. 5A is a cross section of the device such as the cross section of FIG. 4B. FIG. 5A illustrates the heater positioned on both the top and lateral sides of the ridge 22. As a result, the heater is positioned on both the top and lateral sides of the electro-absorption medium 27. In some instances, the heater 50 is positioned on one or more of the lateral sides of the electro-absorption medium 27 without being positioned on the top of the electro-absorption medium 27 and/or on one or more of the lateral sides of the ridge 22 without being positioned on the top of the ridge 22. The heater does not extend down to the base of the ridge but can extend all the way to the base of the ridge.

Figure 5B:
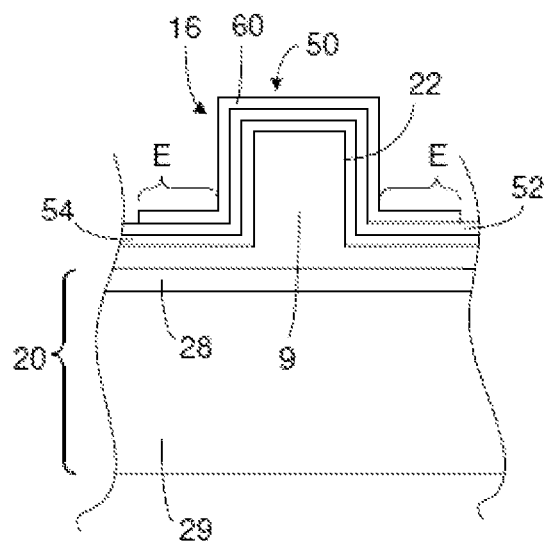
FIG. 5B is a cross section of a portion of a device that includes a heater on a modulator.

The heater 50 can extend away from the ridge 22 such that the heater 50 is positioned over the slab regions. For instance, FIG. 5B is a cross section of the modulator where the heater is positioned on the ridge of the electro-absorption medium 27, extends down to the base of the ridge 22, and extends away from the base of the ridge 22 on the slab regions. The distance that the heater extends away from the ridge is labeled E in FIG. 5B. The distance is equal to the distance between the edge of the heater and the portion of the heater on the lateral side of the ridge 22. Increasing the distance that the heater extends away from the ridge can reduce the degree of localized heating and can increase the power requirements for the device. In some instances, the distance that the heater extends away from the ridge is less than 2 μm, 1 μm, or 0.5 μm and can be 0 μm. The bottom or lower side of the heater 50 is between the top (or upper side) of the heater 50 and the modulator 9 and/or the electro-absorption medium 27. In some instances, the heater 50 is arranged such that the bottom (or lower side) of the heater 50 does not contact the device at a location that is more than 2 μm, 200 μm, or 500 μm away from a lateral side of the ridge and/or an edge of the heater is not located more than 2 μm, 200 μm, or 500 μm away from the nearest lateral side of the ridge. In other words, no portion of the heater through which heat travels to the device is located more than 2 μm, 200 μm, or 500 μm away from the nearest lateral side of the ridge or the heater is not positioned over a location that is more than 2 μm, 200 μm, or 500 μm away from the nearest lateral side of the ridge.

In FIG. 4A through FIG. 5B, the bottom (lower side) of the heater 50 is between the top of the heater 50 and the modulator 9 and/or the electro-absorption medium 27. Moving the bottom of the heater 50 closer to the electro-absorption medium 27 and/or the ridge 22 reduces the distance over which the generated heat must be conducted in order to elevate the temperature of the modulator and can accordingly reduce the amount of heat that must be generated in order to achieve a particular temperature within the modulator. Reducing the thickness of the one or more layers of material between the bottom of the heater and the electro-absorption medium 27 can move the bottom of the heater 50 closer to the electro-absorption medium 27. For instance, reducing the thickness of the one or more claddings 54 and the one or more insulating layers 52 can move the bottom of the heater 50 closer to the electro-absorption medium 27. In some instances, all or a portion of the bottom of the heater 50 is within 0.5, 1, or 2 μm of the electro-absorption medium 27.

Figure 6A:
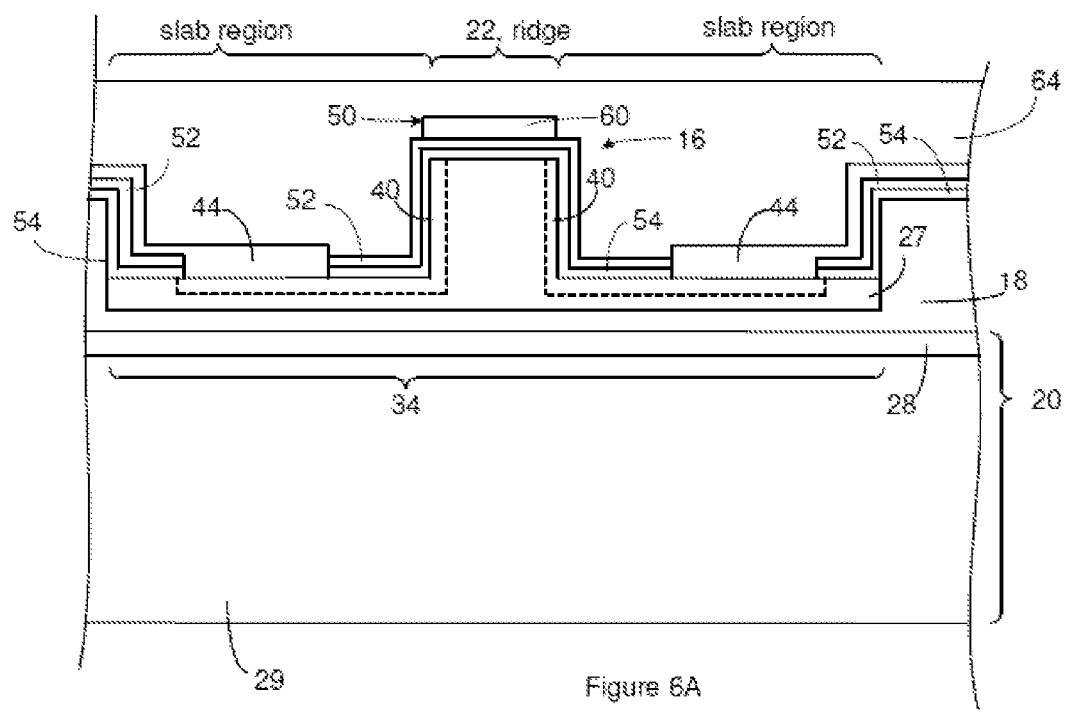
FIG. 6A and FIG. 6B illustrate the device of FIG. 4A through FIG. 4C in combination with the modulator of FIG. 2E.
Figure 6B:
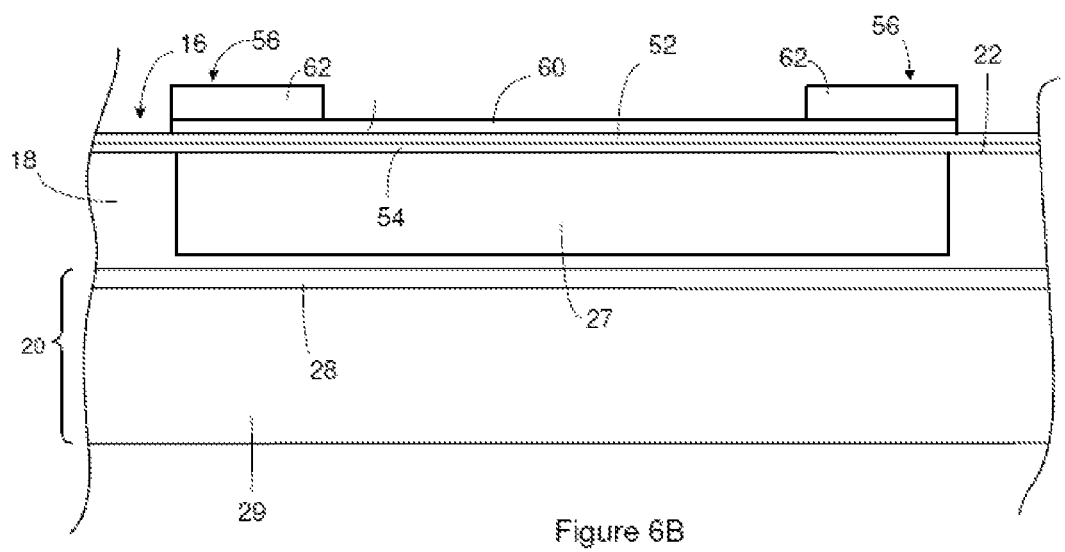

The details of the modulator construction are not illustrated in FIG. 4A through FIG. 5B; however, the modulator can have a variety of constructions including, but not limited to, the constructions of FIG. 2E or FIG. 3. In order to illustrate this concept, FIG. 6A and FIG. 6B illustrate the device of FIG. 4A through FIG. 4C in combination with the modulator of FIG. 2E. FIG. 6A is a cross section of the device taken through the modulator. FIG. 6B is a cross section of the device taken along the length of the waveguide. The heater 50 is positioned over at least a portion of the electro-absorption medium 27 that is included in the modulator such that the electro-absorption medium 27 is located between the heater 50 and the base. FIG. 6B shows that the heater 50 does not extend beyond the perimeter of the electro-absorption medium 27; however, one or both ends of the electro-absorption medium 27 can extend beyond the perimeter of the electro-absorption medium 27.

Although prior depictions of the modulators do not show the electrical conductors 44 extending beyond the slab region of the electro-absorption medium 27, a portion of each electrical conductor 44 can extend beyond the slab regions as illustrated in FIG. 6A. Accordingly, the electrical conductors 44 can include contact pads that are positioned outside of the slab regions for connection to the electronics. Additionally, the electrical conductors 44 can have dimensions of a heat conductor and can accordingly be configured to act as a heat sink that dissipates heat generated by the modulator.

As is evident in FIG. 6A, a protective layer 64 can optionally be formed over the above devices. In some instances, the protective layer 64 can have a thermal conductivity that is less than the thermal conductivity of the one or more claddings 54 and/or the one or more insulating layers 52. The reduced thermal conductivity of the protective layer 64 causes heat generated by the heater to be directed toward the modulator and can accordingly reduce the energy requirements of the heater as well as reduce thermal cross talk. Suitable protective layers include, but are no limited to, silica, silicon nitride, and aluminum oxide. Although the protective layer is disclosed as a single layer of material, the protective layer can be constructed of multiple layers of material. In some instances, one, two or three layers of the protective layer have a thermal conductivity greater than 0.75 WK/m, 1.0 WK/m, or 1.25 WK/m. The protective layer is not illustrated in FIG. 6B.

When the conductors 56 includes the conducting layer 60 and the conductive layer 62, the heater 50, one or more insulating layers 52, one or more claddings 54, and conductors 56 can be fabricated using fabrication technologies that are employed in the fabrication of integrated circuits, optoelectronic circuits, and/or optical devices. However, these methods typically lead to depositing and patterning the electrically conducting layer 60 followed or preceded by depositing and patterning the electrically conductive layer 62. Additionally or alternatively, these methods can include etch a material so as to open a hole located over the ridge. These methods can require alignment of multiple different masks with one another and/or with the ridge. As a result, there is a need for a simplified method of fabrication the heater 50 on a ridge. Further, these methods can result in at least a portion of the heater 50 being located on at least one lateral side of the ridge. However, simulation results have shown the locating all or a portion of the heater on the side of the ridge can reduces the efficiency of the heater. As a result, in some instances, a method that allows the heater 50 to be formed entirely over the ridge is desirable. The disclosed method can be adapted so the entire heater 50 is positioned over the ridge.

Figure 7A:
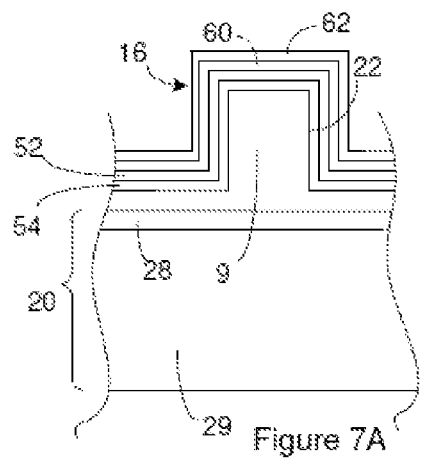
Figure 7B:
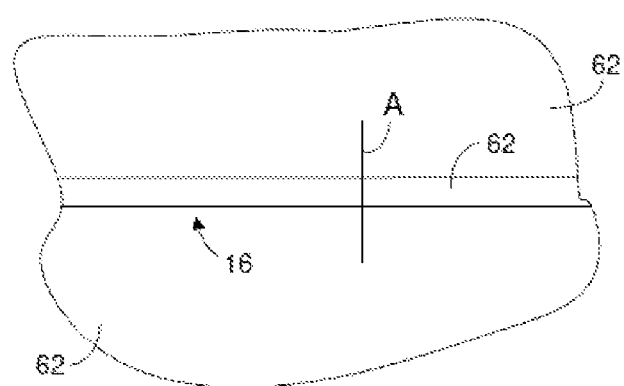
FIG. 7B is a topview of the device precursor shown in FIG. 7A.

FIG. 7A through FIG. 7O illustrate a simplified method of forming the heater when the conductors 56 includes the conducting layer 60 and the conductive layer 62. FIG. 7A is a cross section of a portion of a device precursor where the heater will be fabricated. FIG. 7B is a topview of the device precursor. FIG. 7A can be a cross section of the device precursor shown in FIG. 7B taken along the line labeled A in FIG. 7B. The device precursor includes an insulating layer 52 and optional cladding 54 positioned on a modulator 9. The electrically conducting layer 60 is formed on the cladding 54. When the cladding is not present on the insulating layer 52, the electrically conducting layer 60 can be formed on the insulating layer 52. Suitable methods for forming the conducting layer 60 and the conductive layer 62 on the device precursor include, but are not limited to, sputtering, evaporation, PECVD and LPCVD.

Figure 7C:
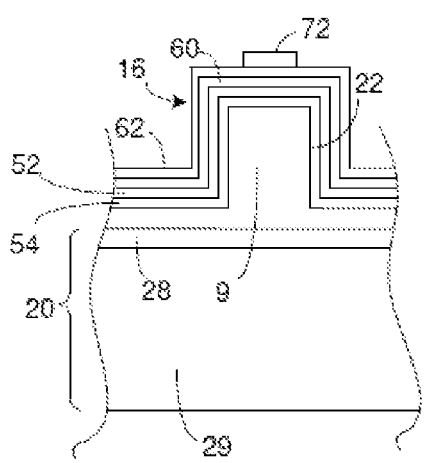
FIG. 7C is a cross section of a portion of a device precursor generated by forming a first mask on the device precursor of FIG. 7A and FIG. 7B so as to form the device precursor of FIG. 7C.
Figure 7D:
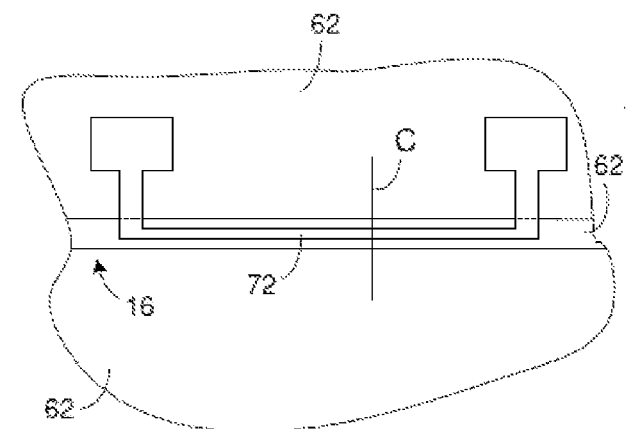
FIG. 7D is a topview of the device precursor shown in FIG. 7C.

A first mask 72 is formed on the device precursor of FIG. 7A and FIG. 7B so as to form the device precursor of FIG. 7C and FIG. 7D. FIG. 7C is a cross section of a portion of a device precursor where the heater will be fabricated. FIG. 7D is a topview of the device precursor. FIG. 7C can be a cross section of the device precursor shown in FIG. 7D taken along the line labeled C in FIG. 7D.

The first mask 72 can be a solid and in direct contact with the device precursor. The first mask 72 protects the region of the device precursor where the heater 50, conductors 56, and contact pads 58 will be formed.

Suitable first masks 72 include, but are not limited to, silica, silicon nitride, and photoresist. In some instances, the first mask 72 is a photoresist that is patterned by exposing the photoresist to light through a photomask. The photoresist can be a positive photoresist or a negative photoresist.

Figure 7E:
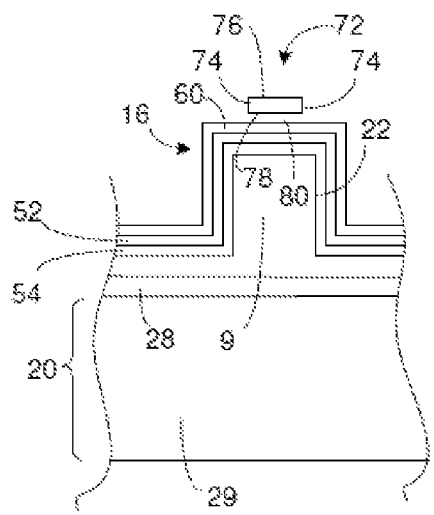
FIG. 7E is a cross section of the device precursor shown in FIG. 7F and after a first etch is performed on the device precursor of FIG. 7C and FIG. 7D.
Figure 7F:
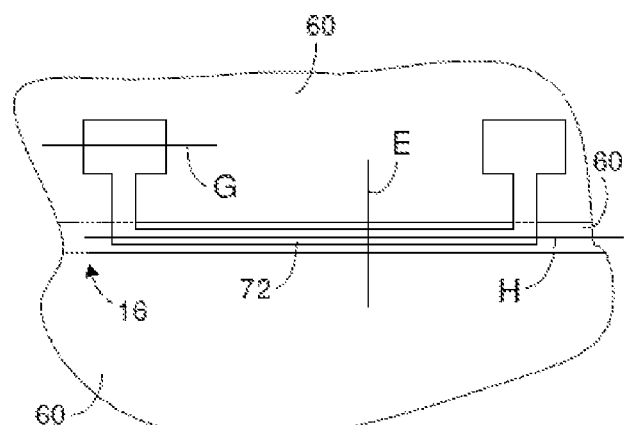
FIG. 7F is a topview of the device precursor shown in FIG. 7E.
Figure 7G:
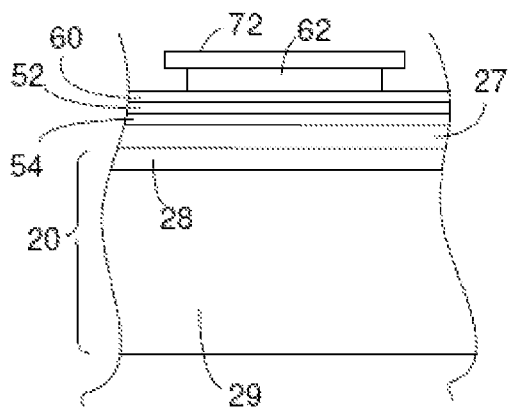
FIG. 7G can be a cross section of the device precursor shown in FIG. 7F taken along the line labeled G in FIG. 7F.
Figure 7H:
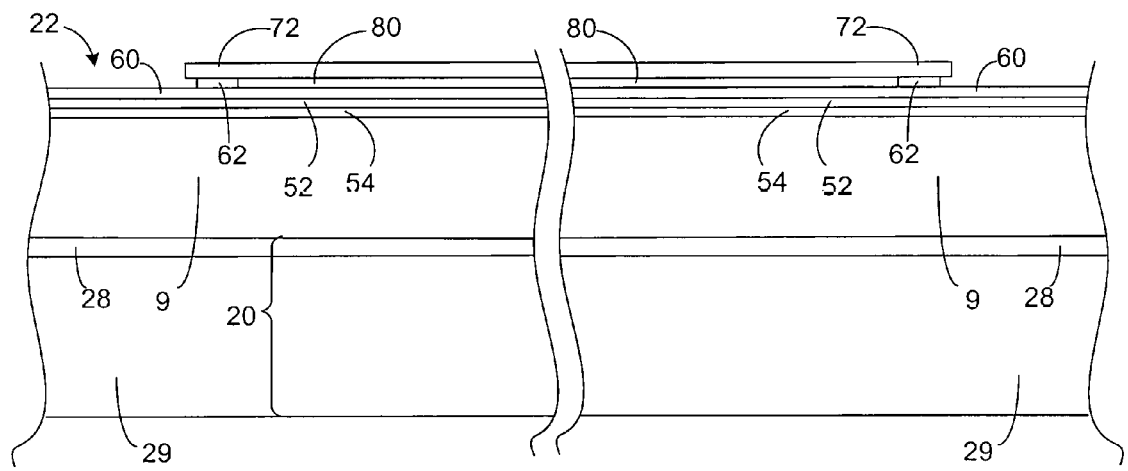
FIG. 7H can be a cross section of the device precursor shown in FIG. 7F taken along the line labeled H in FIG. 7F.

A first etch is performed on the device precursor of FIG. 7C and FIG. 7D so as to form the device precursor of FIG. 7E through FIG. 7H. FIG. 7E, FIG. 7G, and FIG. 7H are each a cross section of a portion of a device precursor. FIG. 7F is a topview of the device precursor. FIG. 7E can be a cross section of the device precursor shown in FIG. 7F taken along the line labeled E in FIG. 7F. FIG. 7G can be a cross section of the device precursor shown in FIG. 7F taken along the line labeled G in FIG. 7F. FIG. 7H can be a cross section of the device precursor shown in FIG. 7F taken along the line labeled H in FIG. 7F.

Suitable first etches include, but are not limited to, a selective wet etch. For instance, the wet etch can be selected to etch the conductive layer 62 at a higher rate than the conducting layer 60. A suitable etch rate ratio (etch rate for the conductive layer 62:etch rate for the conducting layer 60) includes an etch rate ratio greater than 200:1, 100:1, or 50:1. As an example, when the conductive layer 62 is Al and the conducting layer 60 is Ti, a suitable wet etch is 16:1:1:2 aluminum etch:phosphoric acid (H3PO4) (w/w) 71.9-73.9%, nitric acid ($HNO_3$) (w/w) 2.7-3.7%, acetic acid ($CH_3COOH$) (w/w) 2.8-3.8%, chloride (Cl) 1 ppm max, sulfate ($SO_4$) 20 ppm max.

Since the first etch is selective for the conductive layer 62, the conducting layer 60 effectively acts as an etch stop. As a result, the first etch can be performed for a time that is sufficient for the first etch to undercut the first mask 72 as is evident in FIG. 7G. The duration of the first etch is selected such that the portion of the first mask 72 that is over the desired location of the heater is completely undercut by the first etch as is illustrated in FIG. 7E. The entire width of the portion of the conductive layer 62 over the heater is removed as is evident from the absence of the conductive layer 62 in FIG. 7E. For instance, FIG. 7E illustrates that the first mask 72 has edges 74 between a top side 76 and a bottom side 78. In FIG. 7E, a line can be drawn perpendicular to one of the edges 74 such that the line extends through the opposing edge 74. The first etch removes the material from under the first mask 72 such that an opening 80 extends from under one edge 74 of the first mask to under an opposing edge 74 of the first mask. The opening can be created by the first etch starting to undercut the first mask at each edge 74 and continuing until the etching activity opposing edges meets under the first mask 72. Accordingly, in some instances, the first etch tunnels under the first mask 72 from opposing directions. The first mask 72 bridges the opening 80 between supporting regions of the conductive layer 62 as is evident in FIG. 7H.

The portions of the conductive layer 62 that remain on the device precursor after the first etch can serve as the conductors 56 and contact pads 58. Accordingly, the first mask 72 defines the first mask 72, conductors 56 and contact pads 58 on the device. Since the method etches the conductors 56 and contact pads 58 before the heater, the residual metals that are commonly left on the sidewalls of the ridge are effectively removed. When the first etch undercuts the first mask 72, the first mask 72 extends beyond the perimeter of the location that is desired for the conductors 56 and contact pads 58. The distance that the first mask extends beyond the perimeter desired for the conductors 56 and contact pads 58 can be a function of the duration of the first etch. For instance, these dimensions can be selected such that the first etch removes the conductive layer 62 over the heater without removing the conductive layer 62 that will serve as the conductors 56 and contact pads 58. Accordingly, the lateral dimension (length, width) of the portion of the first mask 72 over the conductors 56 and contact pads 58 exceeds the width of the portion of the first mask 72 over the heater. Further, the lateral dimension (length, width) of the portion of the first mask 72 over the conductors 56 and contact pads 58 exceeds the lateral dimensions that are desired for the conductors 56 and contact pads 58. For instance, the first mask 72 can extend beyond the perimeter of the desired conductors 56 and contact pads 58 as is evident in FIG. 7G. In some instances, the first mask 72 extends beyond the perimeter of the location that is desired for the conductors 56 and contact pads 58 by a distance that is at least one half the width of the heater. In one example, the first mask 72 extends more than 0.25 µm, 0.5 µm, or 1 µm beyond the perimeter of the location that is desired for the conductors 56 and contact pads 58 and/or the first etch undercuts the first mask 72 by at least 0.25, 0.5, or 1.

Figure 7I:
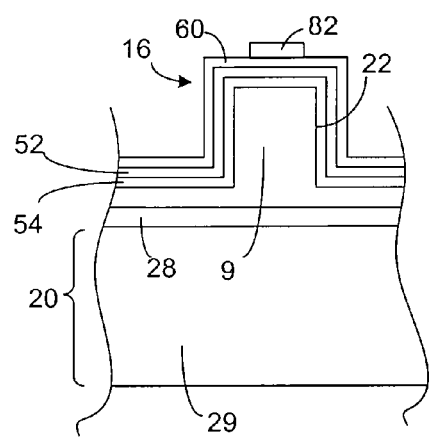
FIG. 7I is a cross section of the device precursor shown in FIG. 7E through FIG. 7H after the first mask is removed from the device precursor of FIG. 7E through FIG. 7H and a second mask is formed on the device precursor.
Figure 7J:
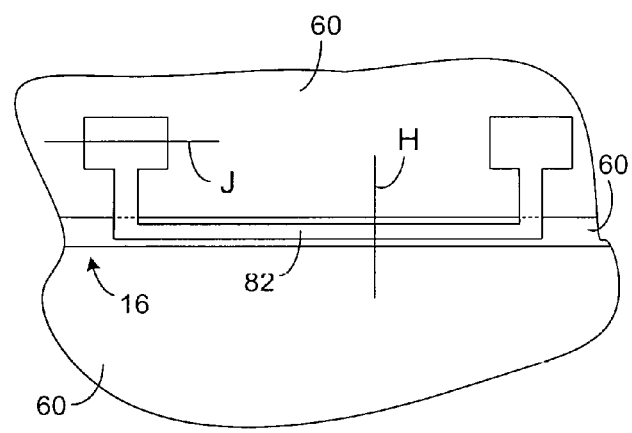
FIG. 7J is a topview of the device precursor shown in FIG. 7I.
Figure 7K:
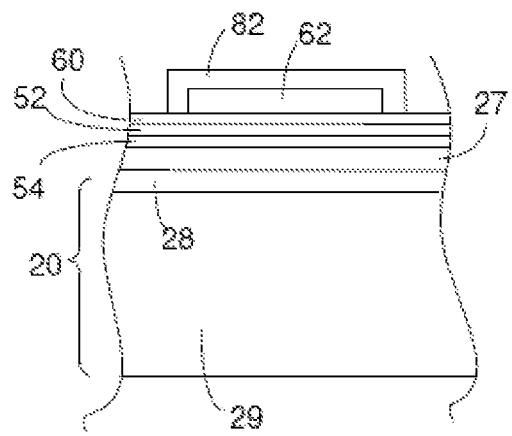
FIG. 7K can be a cross section of the device precursor shown in FIG. 7J taken along the line labeled J in FIG. 7J.

The first mask 72 is removed from the device precursor of FIG. 7E through FIG. 7H and a second mask 82 is formed on the device precursor so as generate the device precursor of FIG. 7I through FIG. 7K. FIG. 7I and FIG. 7K are each a cross section of a portion of a device precursor. FIG. 7J is a topview of the device precursor. FIG. 7I can be a cross section of the device precursor shown in FIG. 7J taken along the line labeled H in FIG. 7J. FIG. 7K can be a cross section of the device precursor shown in FIG. 7J taken along the line labeled J in FIG. 7J.

The second mask 82 can be a solid and in direct contact with the device precursor. The second mask 82 protects the conductors 56, and contact pads 58 and also protects the region of the device precursor where the heater 50 will be formed.

Suitable second masks 82 include, but are not limited to, photoresist, silica, and silicon nitride. In some instances, the second mask 74 is a positive photoresist or a negative photoresist that is patterned by exposing the photoresist to light through a photomask. The photomask can be the same as the photomask used to form the first mask 72 both in that the photomask is physically the same photomask and also in that the pattern shape and pattern dimensions of the photomask are the same during the formation of the first mask 72 and during the formation of the second mask 82. For instance, the pattern of the photomask can be fixed and not alterable between formation of the first mask 72 and the formation of the second mask 82. As a result, the second mask 82 can have the same pattern on the device precursor as the first mask 72 and can be located in the same position on the device precursor as was the first mask 72. Alternately, the photomask can be different from the photomask used to form the first mask 72. For instance, a first photomask can be used to form the first mask 72 and a second first photomask can be used to form the second mask 82. The first photomask can have the same pattern or a different pattern from the second photomask. When the first photomask is different from the second photomask, at least the region of the first photomask that defines the portion of the first mask 72 that protects the region of the device precursor where the heater 50 will be formed and the region of the second photomask that defines the portion of the second mask 82 that protects the region of the device precursor where the heater 50 will be formed have the same pattern and dimensions. In some instances, the region of the first photomask that defines the portion of the first mask 72 that protects the region of the device precursor where the heater 50, conductors 56, and contact pads 58 will be formed and the region of the second photomask that defines the portion of the first mask 72 that protects the region of the device precursor where the heater 50, conductors 56, and contact pads 58 will be formed have the same pattern and dimensions even though other regions of the first mask are different from the second mask.

When the same photomask is used to form the first mask 72 and the second mask 82, the first mask 72 and the second mask 82 can have a different vertical dimensions (thickness) and/or lateral dimensions (width, length) even though the first mask 72 and the second mask 82 have the same pattern. For instance, the lateral dimensions of the resist can be changed by changing the photoresist exposure time and/or development time. In one example where the same photomask is used to form the first mask 72 and the second mask 82, the first mask 72 and the second mask 82 are located in the same location on the device precursor, have the same shape, the same lateral dimensions (width and length), but the vertical dimensions (thickness) are the same or different.

When the second mask 82 has the same lateral dimensions as the first mask 72, the second mask 82 can extend beyond the perimeter of the conductors 56 and contact pads 58 as is evident in FIG. 7K. The reduced size of the conductors 56 and contact pads 58 relative to the second mask can be a result of the first mask 72 being undercut as discussed above.

Figure 7L:
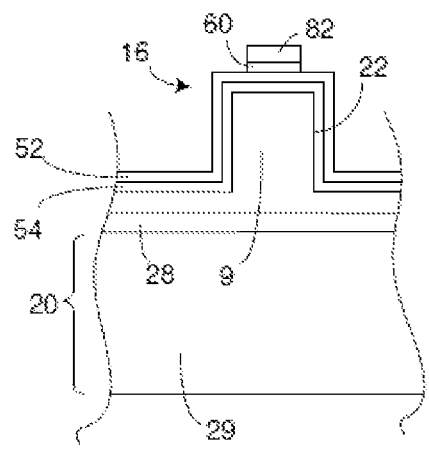
FIG. 7L is a cross section of the device precursor shown in FIG. 7I through FIG. 7K after a second etch is performed on the device precursor of FIG. 7I through FIG. 7K.
Figure 7M:
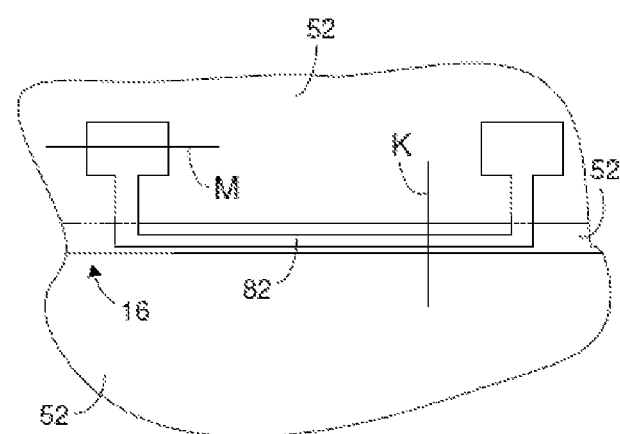
FIG. 7M is a topview of the device precursor shown in FIG. 7L.

A second etch is performed on the device precursor of FIG. 7I through FIG. 7K so as to form the device precursor of FIG. 7L through FIG. 7N. FIG. 7L and FIG. 7N are each a cross section of a portion of a device precursor. FIG. 7M is a topview of the device precursor. FIG. 7L can be a cross section of the device precursor shown in FIG. 7M taken along the line labeled K in FIG. 7M. FIG. 7N can be a cross section of the device precursor shown in FIG. 7M taken along the line labeled M in FIG. 7M.

The second etch is performed for a duration sufficient to etch through the exposed electrically conducting layer 60. Although, in some instances, a portion of conducting layer 60 extends out from under electrically conductive layer 62 as is evident from FIG. 7N, this feature is not shown in FIG. 7O.

The portion of the electrically conducting layer 60 that remain on the device precursor after second etch and that is not under a conductor 56 and/or contact pad 58 serves as the heater. Accordingly, the second etch defines the heater on the device. Suitable second etches include, but are not limited to, wet etches and dry etches. When a directional dry etch is employed, the edges of the second mask 82 can be aligned with the edges that are desired for the heater. When a wet etch is employed, the edges of the second mask 82 can extend beyond the edges that are desired for the heater a sufficient distance to compensate for the wet etch under etching the second mask 82.

The second mask 82 is removed from the device precursor to provide the topview of the device shown in FIG. 7O. Additional processing of the result can optionally be performed. For instance, electrical conductors 44 can be added to provide the device shown in FIG. 4A through FIG. 4C.

As noted above, the same portion of a photomask can be used to generate the first mask 72. FIG. 8 illustrates use of a photomask. The photomask has a pattern of regions that transmit light at different intensity levels. For the purposes of illustration, the illustrated photomask has opaque regions 86 and highly transmissive regions 88; although, regions of a photomask can have levels of transmission between these levels as occurs in gray scale masks. The pattern of regions on the photomask is transferred to a photoresist 90 by illuminating the photoresist through the photomask. When the photoresist is a positive photoresist, the regions of the photoresist exposed to the light become soluble in a developer while regions that are not exposed are not soluble in the developer. As a result, when the photoresist is developed, the regions of the photoresist that are exposed to the light are removed from the device while the regions of the photoresist that are not exposed to the light remain in place on the device. Accordingly, when the first mask 72 is a positive photoresist, the regions of the photoresist that are not exposed to the light can serve as the first mask. When the first mask 72 is a negative photoresist, the regions of the photoresist that are exposed to the light can serve as the first mask.

The modulator of FIG. 4A through FIG. 7O can have constructions other than the constructions of FIG. 1A through FIG. 3. Examples of other suitable modulator constructions can be found in U.S. patent application Ser. No. 12/653,547, filed on Dec. 15, 2009, entitled "Optical Device Having Modulator Employing Horizontal Electrical Field," and U.S. patent application Ser. No. 13/385,774, filed on Mar. 4, 2012, entitled "Integration of Components on Optical Device," each of which is incorporated herein in its entirety. U.S. patent application Ser. Nos. 12/653,547 and 13/385,774 also provide additional details about the fabrication, structure and operation of these modulators. In some instances, the modulator is constructed and operated as shown in U.S. patent application Ser. No. 11/146,898; filed on Jun. 7, 2005; entitled "High Speed Optical Phase Modulator," and now U.S. Pat. No. 7,394,948; or as disclosed in U.S. patent application Ser. No. 11/147,403; filed on Jun. 7, 2005; entitled "High Speed Optical Intensity Modulator," and now U.S. Pat. No. 7,394,949; or as disclosed in U.S. patent application Ser. No. 12/154,435; filed on May 21, 2008; entitled "High Speed Optical Phase Modulator," and now U.S. Pat. No. 7,652,630; or as disclosed in U.S. patent application Ser. No. 12/319,718; filed on Jan. 8, 2009; and entitled "High Speed Optical Modulator;" or as disclosed in U.S. patent application Ser. No. 12/928,076; filed on Dec. 1, 2010; and entitled "Ring Resonator with Wavelength Selectivity;" or as disclosed in U.S. patent application Ser. No. 12/228,671, filed on Aug. 13, 2008, and entitled "Electrooptic Silicon Modulator with Enhanced Bandwidth;" or as disclosed in U.S. patent application Ser. No. 12/660,149, filed on Feb. 19, 2010, and entitled "Reducing Optical Loss in Optical Modulator Using Depletion Region;" each of which is incorporated herein in its entirety. A review of the modulators disclosed in these applications shows that the slab regions of the electro-absorption medium 27 are optional.

The device can also include one or more temperature sensors (not shown) that are each positioned to sense the temperature of the modulator and/or the temperature of a zone adjacent to the modulator. Suitable temperature sensors include, but are not limited to, thermocouples, thermistors, integrated PN diodes, or other integrated semiconductor devices.

The electronics can adjust the level of electrical energy applied to the heater in response to the output received from the one or more temperature sensors in a feedback loop. For instance, the electronics can operate the heater such that the temperature of the heater stays at or above a threshold temperature ($T_{th}$) during operation of the device. For instance, when the electronics determine that the temperature of the modulator falls below the threshold temperature, the electronics can apply electrical energy to the heater so as to bring the temperature of the modulator to or above the threshold temperature. However, when the electronics determine that the temperature of the modulator falls above the threshold temperature, the electronics can refrain from applying the electrical energy to the heater. As a result, when the electronics determine that the temperature of the modulator is above the threshold temperature, the temperature of the modulator can float in response to the operation of the device in the ambient atmosphere.

The device is configured to operate over an operational ambient temperature range. For instance, the device should be able to continue operating when the ambient temperature in which the device is positioned (TA) extends from TL to TH. In some instances, TL is below 0° C., 10° C., or 20° C. and/or TH is greater than 50° C., 70° C., or 80° C. The operational ambient temperature range is typically from TL=0° C. to TH=70° C. The operational temperature range is generally defined as part of the specification for the device. In general the operational temperature range is designed so the device meets customer requirements.

The width of the band of wavelengths that can be efficiently modulated by a modulator is the operating bandwidth (OBW) of the modulator. The operating bandwidth is generally the length of the band of wavelengths where the modulator has low insertion loss and high extinction ratio at a particular temperature. For a Franz Keldysh modulator constructed according to FIG. 2E, the operating bandwidth (OBW) is generally about 35 nm. The operating bandwidth (OBW) for a modulator can be identified by applying a modulation signal to the modulator and measuring the response of the optical signal through the modulator over a range of wavelengths. The range of wavelengths for which the insertion loss and high extinction ratio produce loss of less than 1 dB can serve as the operating bandwidth. In some instances, the range of wavelengths for which the insertion loss and high extinction ratio produce loss of less than 1.5 dB or 2.0 can serve as the operating bandwidth. In some instances, the operating wavelength range for a modulator is more than 25 nm, 30 nm, or 35 nm and/or less than 40 nm, 50 nm, or 60 nm.

The wavelength at the center of the operating bandwidth (OBW) is considered the modulation wavelength. The wavelengths that fall within the operating bandwidth (OBW) shifts in response to temperature changes; however, the operating bandwidth (OBW) stays constant or substantially constant. As a result, the modulation wavelength is a function of temperature but the operating bandwidth (OBW) can be approximate as being independent of temperature. The rate that the modulation wavelength of the above modulators shifts in response to temperature changes ($\Delta\lambda_m$) is about 0.76 nm/° C. and the operating bandwidth (OBW) stays substantially constant at about 35 nm.

The most intense wavelength produced by the light source is considered the channel wavelength of the light signal produced by the light source. The light source and the modulator are generally configured to operate together at a design temperature (TT). For instance, the light source and modulator are generally configured such that the modulation wavelength and the channel wavelength are the same at the design temperature. As a result, the modulator efficiently modulates the output of the light source at the design temperature. The design temperature is generally equal to a common temperature for the ambient environment in which the device is positioned. A typical design temperature is 60° C. In some instances, the design temperature serves as the threshold temperature ($T_{th}$).

The channel wavelength and the modulation wavelength at the design temperature are the design wavelength ($\lambda_T$). The modulation wavelength at a particular temperature can be expressed relative to the design wavelength. For instance, the modulation wavelength at a particular temperature can be expressed as $\lambda_T-(TT-T_m)(\Delta\lambda_m)$ where $T_m$ represents the temperature of the modulator.

The channel wavelength shifts in response to changes in the temperature of the light source ($T_{LS}$). For instance, the channel wavelength shift rate for a light source ($\Delta\lambda_{LS}$) such as a DFB laser is generally about 0.08 nm/° C. at 1550 nm and for a Fabry-Perot laser is generally about 0.5 nm/° C. The wavelength of the light source at a particular temperature can be expressed as follows: $\lambda_T-(TT-T_{LS})(\Delta\lambda_{LS})$. Other suitable light sources have a rate of modulation wavelength shift greater than 0.05, 0.1, or 0.2 nm/° C. and/or less than 0.3, 0.5, or 0.7 nm °C.

Variables in the fabrication process generally produce modulators having a range of modulation wavelengths at a particular temperature. For instance, a batch of modulators will generally have modulation wavelengths that are equal to the desired modulation wavelengths+/−a manufacturing tolerance. The manufacturing tolerance can be indicated by a multiple of the standard deviation. For instance, a Franz Keldysh modulator constructed according to FIG. 2E generally has a manufacturing tolerance (MT) of about 7.5 nm where 7.5 nm represents three times the standard deviation. The presence of this manufacturing tolerance reduces the amount that the wavelength of a light signal being received by the modulator can shift while still reliably falling within the operating bandwidth (OBW) for each of the modulators. For instance, a light signal that shifts by less than a permissible range (PR) will still reliably have a wavelength that falls within the operating bandwidth (OBW) of a modulator fabricated with the above manufacturing tolerance and can accordingly be efficiently modulated by the modulator. The permissible range (PR) can be determined as ((OBW−2MT)/2).

The difference between the modulation wavelength and the channel wavelength must be less than or equal to the permissible range (PR) of the modulator in order for the modulator to reliably provide efficient modulation of the light signal. Accordingly, under these conditions, it can be stated that $[\lambda_T-(TT-T_m)(\Delta\lambda_m)]-[\lambda_T-(TT-T_{LS})(\Delta\lambda_{LS})] \leq PR$ or $(TT-T_{LS})(\Delta\lambda_{LS})-(TT-T_m)(\Delta\lambda_m) \leq PR$. Solving for $T_{LS}$ provides that $T_{LS} \geq TT-[PR-(TT-T_m)(\Delta\lambda_m)]/(\Delta\lambda_{LS})$. When the electronics hold the temperature of the modulator constant at $T_{th}$, this expression becomes $T_{LS} \geq TT-[PR-(TT-T_{th})(\Delta\lambda_m)]/(\Delta\lambda_{LS})$. In instances where the threshold temperature is equal to the design temperature (TT), this expression reduces to $T_{LS} \geq TT-[PR/(\Delta\lambda_{LS})]$ or $T_{LS} \geq TT-[(OBW/2-MT)/(\Delta\lambda_{LS})]$. Using the above numbers for a DFB laser where the threshold temperature is equal to a design temperature of 60° C. shows that the light source temperature ($T_{LS}$) can fall as low as [60° C.−[(35 nm/2−7.5 nm)]/(0.08 nm/° C.)]=−65° C. before the channel wavelength falls outside of the permissible range (PR) of the modulator. Accordingly, efficient modulation of the light signal produced by the light source can still be achieved when the light source temperature ($T_{LS}$) drops to −65° C. However, TL is generally about 0° C. As a result, the threshold temperature can actually be reduced below the design temperature. For instance, a threshold temperature of 54° C. permits the light source temperature ($T_{LS}$) to fall as low as −8° C. before the channel wavelength falls outside of the permissible range (PR) of the modulator. The ability of the threshold temperature to be below the design temperature reduces the power requirements associated with the heater.

As noted above, the electronics can refrain from operating the heater when the temperature of the modulator would be above the threshold temperature without the operation of the heater. Substituting the above numbers into $(TT-T_{LS})(\Delta\lambda_{LS})-(TT-T_m)(\Delta\lambda_m) \leq PR$ shows that the temperature of the light source and the modulator can concurrently be as high as about 74° C. while still having a wavelengths that fall within the permissible range (PR). However, the upper end of the operational ambient temperature range (TH) is generally about 70° C. As a result, the operation of the modulator and light sensor can drive the temperature of both of these components up by an additional 4° C. while still achieving efficient modulation of the light signal. Accordingly, the method of operating the heater provides efficient light signal modulation across the entire operational ambient temperature range (TH).

Simulation results have shown that for a heater that is 20 μm long used with a modulator having a ridge with of 1 μm, a ridge height of 2.7 μm, and a slab region thickness of 0.3 μm, the power requirements for a heater constructed as disclosed above are about 1-2 mW/° C. Accordingly, when the temperature of a modulator would be at 0° C. without operation of the heater, a power in a range of 60 to 120 mW would be needed to keep the temperature of the modulator at a threshold temperature of 60° C. and a power of only about 54 to 108 mW would be needed to keep the temperature of the modulator at a threshold temperature of 54° C. Since 0° C. is generally the bottom of the operational ambient temperature range, the maximum power requirement for the heater is less than 120 mW, 108 mW, 80 mW, 60 mW or 54 mW.

Although the device is disclosed as having a single modulator and heater, this is for illustrative purposes and a single device will often have more than one modulator that includes a heater constructed and/or operated as disclosed above. Examples of a single device that includes multiple light sources and multiple modulators can be found in U.S. patent application Ser. No. 14/048,685, filed on Oct. 8, 2013, and entitled "Use of Common Active Materials in Optical Components" and in other patent applications that are incorporated into this disclosure. Different heaters on a single device can be operated using the same method variables or using different method variables. For instance, different heaters can be operated with different threshold temperatures or can be operated with the same threshold temperature. Accordingly, the different modulators can be at different temperatures.

Although FIG. 1A and FIG. 1B illustrate a waveguide that connects the light source directly with a modulator, the device need not include a light source as is disclosed above. Further, the device can be constructed such that the modulator receives a light signal that includes at least a portion of the light generated from one or more light sources. Accordingly, other components can be optically between the light source and the modulator. For instance, the device can include a multiplexer that multiplexes light signals from multiple light sources into a second light signal that is received by the modulator constructed as disclosed above. Additionally or alternately, the device can include a demultiplexer that receives a light signal from multiple different light sources and demultiplexes the light signal into multiple second light sources such that at least one of the second light signals is received by the modulator constructed as disclosed above. Accordingly, multiplexers and demultiplexers can be positioned between a light source and a modulator that receives at least a portion of the light output from the light sensor. Other examples of components that can be optically between a light source and a modulator that receives at least a portion of the light output by the light source include, but are not limited to, amplifiers, switches, combiners, splitters, y-junctions, optical taps, in-line photodetectors and polarization rotators.

Although the above heater is disclosed as generating heat through the application of electrical energy to the heater, other heating mechanisms can be employed. For instance, the heater can guide a heated liquid or can be a source of a light.

Although the device is disclosed in the context of a silicon-on-insulator platform, the device can be constructed on other platforms.

Although the above modulators are disclosed as having a single heater, a modulator can include more than one heater or more than one heating element. For instance, a heater can include multiple resistors connected in series or in parallel.

Although the heater is disclosed as being positioned on the ridge of a modulator, the heater can be positioned on the ridge of other optical components such as light sensors and light sources such as are disclosed in U.S. patent application Ser. No. 13/506,629. Additionally or alternately, although the fabrication methods disclosed above are disclosed in the context of fabricating a heater, these methods can be applied to fabrication of other components and/or parts of other components.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an optical device, comprising:
using a photomask to form a first mask on a device such that the first mask contacts a material included in the device,
the first mask having edges between a top side and a bottom side,
the bottom side of the mask being between the top side of the mask and the device precursor;
etching the device so as to remove the material from under the first mask such that an opening through the material extends from under one edge of the first mask to under an opposing edge of the first mask with the first mask being located between the opposing edges;
using the photomask to form a second mask on the device after etching the device, the second mask contacting the material and being formed after the first mask; and
removing the second mask from the device.

2. The method of claim 1, further comprising:
removing the first mask before forming the second mask.

3. The method of claim 1, wherein the first mask is a photoresist and the second mask is a photoresist.

4. The method of claim 1, wherein the first mask and the second mask have the same pattern.

5. The method of claim 4, wherein the first mask and the second mask have the same lateral dimensions.

6. The method of claim 5, wherein the first mask and the second mask are formed at the same location on the device.

7. The method of claim 1, further comprising:
removing the first mask after etching the device and before forming the second mask.

8. The method of claim 1, wherein the first mask and the second mask are formed at the same location on the device, and further comprising:
performing a second etch of the device after forming the second mask on the device and before removing the second mask from the device.

9. The method of claim 1, wherein removing the second mask from the device precursor exposes the material contacted by the second mask.

10. A method of forming an optical device, comprising:
generating a device having a layer of a material on a device precursor;
forming a first mask on the layer of material such that the layer of material is between the device precursor and the first mask,
the first mask having edges between a top side and a bottom side, the bottom side of the first mask being between the top side of the first mask and the device; and
etching the device such that the layer of material is removed from under the first mask such that an opening through the material extends from under one edge of the first mask to under an opposing edge of the first mask,
the first mask being located between the opposing edges,
the opening separating a first portion of the material from a second portion of the material,
the first portion of the material being between the first mask and the device precursor, and
the second portion of the material being between the first mask and the device precursor, and
a continuous portion of the first mask extending from a first location over the first portion of the material to a second location over the second portion of the material.

11. The method of claim 10, wherein the first mask has a dimension that extends between the opposing edges of the first mask and the material is removed from under the full length of the dimension.

12. The method of claim 10, wherein the dimension is a linear dimension.

13. The method of claim 12, wherein the dimension is a width of the first mask.

14. The method of claim 10, wherein the device precursor includes a second layer of material on a base and the layer of material is formed on the device precursor such that the second layer of material is between the base and the layer of material, and further comprising:
defining a heater in the second layer of material.

15. The method of claim 10, wherein the opening is between the first portion of the material and the second portion of the material.

16. The method of claim 10, wherein the first portion of the material is a first island of the material on the device precursor and the second portion of the material is a second island on the device precursor and the entire second island is separated from the first island.

17. The method of claim 10, wherein the opening is between the continuous portion of the first mask and the device precursor.

* * * * *